US008044346B2

(12) United States Patent
Kostiainen et al.

(10) Patent No.: US 8,044,346 B2

(45) Date of Patent: Oct. 25, 2011

(54) METHOD AND SYSTEM FOR DESORBING AND IONIZING CHEMICAL COMPOUNDS FROM SURFACES

(75) Inventors: Risto Kostiainen, Helsinki (FI); Tiina Kauppila, Helsinki (FI); Markus Haapala, Vantaa (FI); Jaroslav Pol, Helsinki (FI); Tapio Kotiaho, Espoo (FI)

(73) Assignee: Licentia Oy, Helsinski (FI)

( * ) Notice: Subject to any disclaimer, the term of this patent is extended or adjusted under 35 U.S.C. 154(b) by 505 days.

(21) Appl. No.: 11/962,578

(22) Filed: Dec. 21, 2007

(65) Prior Publication Data

US 2009/0159790 A1 Jun. 25, 2009

(51) Int. Cl.
*H01J 49/00* (2006.01)
*B01D 59/44* (2006.01)

(52) U.S. Cl. ......................... 250/288; 250/281; 250/282

(58) Field of Classification Search .................. 250/281, 250/282, 287, 288, 423 R, 423 P, 425, 427
See application file for complete search history.

(56) References Cited

U.S. PATENT DOCUMENTS 4,733,073 A * 3/1988 Becker et al. ................. 250/288
4,960,992 A * 10/1990 Vestal et al. .................. 250/288
4,988,879 A * 1/1991 Zare et al. .................. 250/423 P
5,055,677 A * 10/1991 Amirav et al. ................ 250/282
5,461,235 A * 10/1995 Cottrell et al. ................ 250/288
5,959,297 A * 9/1999 Weinberg et al. ............. 250/288
6,111,251 A * 8/2000 Hillenkamp .................. 250/288
6,211,516 B1 * 4/2001 Syage et al. .................. 250/288
6,534,765 B1 * 3/2003 Robb et al. .................... 250/288
6,707,035 B2 * 3/2004 Hughey et al. ................ 250/288
6,943,346 B2 * 9/2005 Tan et al. ...................... 250/288
7,091,483 B2 * 8/2006 Fischer et al. ................ 250/288
7,109,476 B2 * 9/2006 Hanold et al. ................ 250/288
7,253,406 B1 * 8/2007 Sheehan et al. ............... 250/288
7,411,186 B2 * 8/2008 Mordehai ..................... 250/288
7,462,824 B2 * 12/2008 Wang ........................... 250/288
2003/0111598 A1 * 6/2003 Gourley et al. ............... 250/288
2004/0056192 A1 * 3/2004 Truche et al. ................. 250/288
2005/0045833 A1 * 3/2005 Fischer et al. ............. 250/423 P (Continued)

FOREIGN PATENT DOCUMENTS

WO 2005094389 A2 10/2005

OTHER PUBLICATIONS

Sheng-Suan Cai et al. , "Comparison of Atmospheric Pressure Photoionization and Atmospheric Pressure Chemical Ionization for Normal-Phase LC/MS Chiral Analysis of Pharmaceuticals", Mar. 15, 2007, pp. 2491-2498, vol. 79, No. 6, American Chemical Society, Tustin, CA.

(Continued)

*Primary Examiner* — Robert Kim
*Assistant Examiner* — Brooke Purinton
(74) *Attorney, Agent, or Firm* — Sughrue Mion, PLLC

(57) ABSTRACT

The invention relates to a method and system for ionizing analyte-containing sample lying on a surface of a substrate. The method comprises directing to the sample a heated flow of desorption gas in order to desorb analyte from the surface, and simultaneously directing to the sample light capable of ionizing the desorbed analyte in the presence of the desorption gas. The invention provides a method and system suitable for efficiently producing ions of neutral and nonpolar molecules on surfaces, for example for mass spectrometric purposes.

15 Claims, 5 Drawing Sheets

U.S. PATENT DOCUMENTS

| | | | | |
|---|---|---|---|---|
| 2006/0076505 | A1 * | 4/2006 | Fischer et al. | 250/423 P |
| 2006/0131497 | A1 * | 6/2006 | Yang et al. | 250/288 |
| 2007/0176113 | A1 * | 8/2007 | Shiea et al. | 250/423 P |
| 2007/0187589 | A1 | 8/2007 | Cooks et al. | |
| 2008/0048107 | A1 * | 2/2008 | Mcewen | 250/282 |
| 2008/0067352 | A1 * | 3/2008 | Wang | 250/288 |
| 2009/0152458 | A1 * | 6/2009 | Vilkov et al. | 250/282 |

OTHER PUBLICATIONS

C. Celma et al., "Simultaneous determination of paracetamol and chlorpheniramine in human plasma by liquid chromatography-tandem mass spectrometry", Journal of Chromatography A, 2000, pp. 77-86, vol. 870.

Robert B. Cody et al.,Versatile New Ion Source for the Analysis of Materials in Open Air under Ambient Conditions, Analytical Chemistry, 2005, pp. 2297-2302, vol. 77.

Thomas H. Eichhold et al., "Simultaneous determination of dextromethorphan, dextrorphan, and guaifenesin in human plasma using semi-automated liquid/liquid extraction and gradient liquid chromatography tandem mass spectrometry", Journal of Pharmaceutical and Biomedical Analysis, 2007, pp. 586-600, vol. 43.

Sami Franssila et al., "A Microfabricated Nebulizer for Liquid Vaporization in Chemical Analysis", Journal of Microelectromechanical System, Oct. 2006, pp. 1251-1259, vol. 15, No. 5.

Markus Haapala et al., "Microchip for Combining Gas Chromatography or Capillary Liquid Chromatography with Atmospheric Pressure Photoionization-Mass Spectrometry", Analytical Chemistry, 2007, pp. 4994-4999, vol. 79.

Renato Haddad et al., "Desorption sonic spray ionization for (high) voltage-free ambient mass spectrometry", Rapit Communications in Mass Spectrometry, 2006, pp. 2901-2905, vol. 20.

Nobuyasu Itoh et al., "Optimization of the dopant for the trace determination of polycyclic aromatic hydrocarbons by liquid chromatography/dopant-assisted atmospheric-pressure photoionization/mass spectrometry", Journal of Chromatography A, 2006, pp. 285-288, vol. 1131.

Tiina J. Kauppila et al., "Anisole, a new dopant for atmospheric pressure photoionization mass spectrometry of low proton affinity, low ionization energy compounds", Rapid Communications in Mass Spectrometry, 2004, pp. 808-815, vol. 18.

Tiina J. Kauppila et al., "Desorption electrospray ionization mass spectrometry for the analysis of pharmaceuticals and metabolites", Rapid Communications in Mass Spectrometry, 2006, pp. 387-392, vol. 20.

Tiina J. Kauppila et al., "Atmospheric Pressure Photoionization Mass Spectrometry. Ionization Mechanism and the Effect of Solvent on the Ionization of Naphthalenes", Analytical Chemistry, Nov. 1, 2002, pp. 5470-5479, vol. 74, No. 21.

Tiina J. Kauppila et al., "New surfaces for desorption electrospray ionization mass spectrometry: porous silicon and ultra-thin layer chromatography plates", Rapid Communications in Mass Spectrometry, 2006, pp. 2143-2150, vol. 20.

Victor V. Laiko et al., "Atomospheric pressure laser desorption/ionization on porous silicon", Rapid Communications in Mass Spectrometry, 2002, pp. 1737-1742, vol. 16.

Antti Leinonen et al., "Liquid chromatography/mass spectrometry in anabolic steroid analysis-optimization and comparison of three ionization techniques: electrospray ionization, atmospheric pressure chemical ionization and atmospheric pressure photoionization", Journal of Mass Spectrometry, 2002, pp. 693-698, vol. 37.

Luc Alexis Leuthold et al., "Desorption electrospray ionization mass spectrometry: direct toxicological screening and analysis of illicit Ecstasy tablets", Rapid Communications in Mass Spectrometry, 2006, pp. 103-110, vol. 20.

Charles N. McEwen et al., "Analysis of Solids, Liquids, and Biological Tissues Using Solids Probe Introduction at Atmospheric Pressure on Commercial LC/MS Instruments", Anal. Chem., 2005, pp. 7826-7831, vol. 77.

Sunnie Myung et al., "Coupling Desorption elctrospray Ionization with Ion Mobility/Mass Spectrometry for Analysis of Protein Structure: Evidence for Desorption of Folded and Denatured States", J. Phys. Chem. B, 2006, pp. 5045-5051, vol. 110.

Marcela Nefliu et al., "Desorption electrospray ionization and electrosonic spray ionization for solid- and solution-phase analysis of industrial polymers", Chem. Commun., 2006, pp. 888-890.

Pekka Ostman et al., "Capillary liquid chromatography-microchip atmospheric pressure chemical ionization-mass spectrometry", Lab Chip, 2006, pp. 948-953, vol. 6.

Pekka Ostman et al., "Microchip Atmospheric Pressure Chemical Ionization Source for Mass Spectrometry", Analytical Chemistry, 2004, pp. 6659-6664, vol. 76, No. 22.

Ramakrishna V. S. Nirogi et al., "Simultaneous quantification of fexofenadine and pseudoesphedrine in human plasma by liquid chromatography/tandem mass spectrometry with electrospray ionization: method development validation and application to a clinical study", Rapid Communications of Mass Spectrometry, 2006, pp. 3030-3038, vol. 20.

Damon B. Robb et al., "Atmospheric Pressure Photoionization: An Ionization Method for Liquid Chromatography-Mass Spectrometry", Analytical Chemistry, 2000, pp. 3653-3659, vol. 72.

Damon B. Robb et al., "Effects of Solvent Flow, Dopant Flow, and Lamp Current on Dopant-Assisted Atmospheric Pressure Photoionization (DA-APPI) for LC-MS Ionization via Proton Transfer", American Society for Mass Spectrometry, 2005, pp. 1275-1290,vol. 16.

Sandra E. Rodriguez-Cruz, "Rapid analysis of controlled substances using desorption electrospray ionization mass spectrometry", Rapid Communications in Mass Spectrometry, 2006, pp. 53-60, vol. 20.

Ville Saarela et al., "Glass microfabricated nebulizer chip for mass spectrometry", Lab Chip, 2007, pp. 644-646, vol. 7.

Jentaie Shiea et al., "Electrospray-assisted laser desorption/ionization mass spectrometry for direct ambient analysis of solids", Rapid Communications in Mass Spectrometry, 2005, pp. 3701-3704, vol. 19.

Jack A. Syage, "Mechanism of (M +H)+ Formation in Photoionization Mass Spectrometry, American Society for Mass Spectrometry", 2004, pp. 1521-1533, vol. 15.

Jack A. Syage et al., "Photoionization mass spectrometry", American Laboratory, 2000, pp. 24-29.

Zoltan Takats et al., "Mass Spectrometry Sampling Under Ambient Conditions with Desorption Electrospray Ionization", Science, 2004, pp. 471-473, vol. 306.

Zoltan Takats et al., "Direct, trace level detection of explosives on ambient surfaces by desorption electrospray ionization mass spectrometry", Chem. Commun., 2005, pp. 1950-1952.

Nari Talaty et al., "Rapid in situ detection of alkaloids in plant tissue under ambient conditions using desorption electrospray ionization", Analyst, 2005, pp. 1624-1633, vol. 130.

Gary J. Van Berkel et al., "Thin-Layer Chromatography and Mass Spectrometry Coupled Using Desorption Electrospray Ionization", Analytical Chemistry, 2005, pp. 1207-1215, vol. 77.

Andre Venter et al., "Droplet Dynamics and Ionization Mechanisms in Desorption Electrospray Ionization Mass Spectrometry", Analytical Chemistry, 2006, pp. 8549-8555, vol. 78.

Junying Wang et al., "Simple and sensitive liquid chromatography/tandem mass spectrometry method for the determination of diazepam and its major metabolites in rat cerebrospinal fluid", Rapid Communications in Mass Spectrometry, 2003, pp. 519-525, vol. 17.

Jing Wei et al., "Desorption-ionization mass spectrometry on porous silicon", Nature, 1999, pp. 243-246, vol. 399.

Daniel J. Weston et al., "Direct Analysis of Pharmaceutical Drug Formulations Using Ion Mobility Spectrometry/ Quadrupole-Time-of-Flight Mass Spectrometry Combines with Desorption Electrospray ionization", Analytical Chemical, 2005, pp. 7572-7580, vol. 77.

Jonathan P. William et al., "Rapid accurate mass desorption electrospray ionization tandem mass spectrometry of pharmaceutical samples", Rapid Communications in Mass Spectrometry, 2005, pp. 3643-3650, vol. 19.

Justin M. Wiseman et al., "Tissue Imaging at Atmospheric Pressure Using Desorption Electrospray Ionization (DESI) Mass Spectrometry", Angewandte Chem., 2006, pp. 7188-7192, vol. 45.

* cited by examiner

METHOD AND SYSTEM FOR DESORBING AND IONIZING CHEMICAL COMPOUNDS FROM SURFACES

BACKGROUND OF THE INVENTION

1. Field of the Invention

The present invention relates to ionization of particles residing at various surfaces. In particular, the invention concerns a novel ionization method for the purposes of mass spectrometry (MS). In addition, the invention concerns ionization systems.

2. Related Art

An important recent development in mass spectrometry is the capability for direct desorption/ionization of analytes from surfaces at ambient conditions. In ambient ionization methods, ions are generated from a sample outside the MS and sampled into the MS without prior sample preparation or separation. Analysis of compounds from both artificial and native surfaces is fast. Several atmospheric pressure direct ionization methods have recently been described, namely desorption/ionization on silicon (DIOS) [Wei et al, *Nature* 1999, 399, 243-246 and Laiko et al, *Rapid Commun. Mass Spectrom.* 2002, 16, 1737-1742], desorption electrospray ionization (DESI) [WO 2005/094389 and Takats et al, *Science* 2004, 306, 471-473], desorption atmospheric pressure chemical ionization (DAPCI) [US 2007/0187589 and Takats et al, *Chem. Commun.* 2005, (15), 1950-1952], direct analysis in real time (DART) [Cody et al, *Anal. Chem.* 2005, 77, 2297-2302], electrospray-assisted laser desorption/ionization (ELDI) [Shiea et al, *J. Rapid Commun. Mass Spectrom.* 2005, 19, 3701-3704], atmospheric solids analysis probe (ASAP) [McEwen et al, *Anal. Chem.* 2005, 77, 7826-7831], and desorption sonic spray (DeSSI) [Haddad et al, *Rapid Commun. Mass Spectrom.* 2006, 20, 2901-2905].

Among the wide range of applications of these techniques are the analysis of explosives, pharmaceuticals, metabolites, proteins, polymers, and drugs of abuse from different surfaces and matrices such as glass, paper, plastics, blood, urine, tablets and ointments. Moreover, the techniques have been applied to discovery of natural products from plant material, imaging of biological tissues, and detection of analytes after separation by thin-layer chromatography (TLC) or ultra-thin layer chromatography (UTLC).

Of the ambient ionization techniques listed above, DESI and DAPCI are most relevant in this context. In DESI, an electrospray source creates charged plume of droplets that are directed at a solid sample a few millimeters to a few centimeters away. The charged droplets pick up the sample through interaction with the surface and then form highly charged ions that can be sampled into a mass spectrometer. DAPCI, on the other hand uses combination of a flow of solvent vapor and a corona discharge to ionize the sample.

The above ambient ionization techniques introduced thus far work efficiently when the analytes are polar and easily protonated or deprotonated. However, neutral and nonpolar analytes are usually ionized less efficiently or not at all.

Atmospheric pressure photoionization (APPI), which was introduced several years ago as a gas-phase ionization technique for liquid chromatography-mass spectrometry (LC-MS) [Robb et al, *Anal. Chem.* 2000, 72, 3653-3659 and Syage et al *Am. Lab.* 2000, 32, 24-29], has expanded the range of analytes that can be analyzed by LC-MS to neutral and nonpolar molecules. Ionization in APPI is initiated by photons emitted by a krypton discharge lamp that photoionizes analytes directly or indirectly through gas-phase reactions with photoionized dopant molecules. Since photoionization is dependent on the ionization energies of both the analytes and the dopant, compounds with low proton affinities that are usually not ionized in electrospray or atmospheric pressure chemical ionization (APCI) can be ionized in APPI. However, the conventional APPI method is used only for liquid-form samples, implying that the samples, if not inherently in liquid phase, must be dissolved. This requires a lot of preparation work by laboratory personnel and sets limitations for the selection of samples that can be used in connection with APPI.

SUMMARY OF THE INVENTION

It is an aim of the invention to achieve an improved ambient ionization technique, that is, a method and system suitable for efficiently producing ions of neutral and nonpolar molecules on surfaces.

In particular, it is an aim of the invention to achieve a process, which is suitable not only for molecules of different size and polarity, but also for analytes which are bound to many various kinds of substrates and by varying physical interactions.

It is also an aim of the invention to achieve an improved method and system for performing mass spectroscopic analyses.

According to one aspect of the invention, there is provided a method for ionizing analyte present on a substrate at ambient pressure, comprising directing a flow of desorption gas to the analyte in order to desorb analyte from the surface, and directing to the analyte light capable of ionizing the analyte in the presence of the desorption gas.

According to one aspect of the invention, the desorption gas is essentially comprised of typically inert nebulizer gas. The nebulizer gas may be e.g. nitrogen. In this case, the nebulizer gas collides with the sample and desorbs analyte, which is further ionized directly by the ionizing light.

According to an alternative aspect of the invention, there desorption gas comprises a mixture of typically inert nebulizing gas and vaporized solvent. The solvent can be a dopant-type solvent. If solvent is present in the desorption gas, the photons emitted by the light source may interact with the solvent so as to first ionize them and further, through collisions of the solvent and the analyte, ionize the analyte itself (indirect ionization). The photons emitted by the light source may also interact directly with the analyte so as to ionize it (direct ionization). The ionization process may also be a mixture of the two processes described above, implying that the two processes take place simultaneously.

The solvent may comprise or consist of, for example, toluene, acetone, hexane, water, methanol, formic acid or any mixture of these or their possible derivatives. According to one embodiment, a dopant-type solvent is used for efficient indirect ionization.

The solvent is normally heated above its vaporization temperature. According to one aspect, the heating of the solvent is achieved by mixing the solvent vapor with heated nebulizing gas. The nebulizer gas can be pre-heated or heated in a gas channel of a nebulizer device, as explained in more detail below.

According to one aspect of the invention, a confined heated vapor jet is produced in order to achieve highly localized surface heating (diameter of heated area typically less than 2 mm).

The analyte can be any chemical compound capable of being ionized using the method herein disclosed.

According to one aspect, liquid solvent is fed to a nebulizer and the liquid solvent is vaporized by heating it in the nebulizer. The resulting vapor is heated further to a target temperature above the vaporizing temperature of the solvent. Thereafter, the heated solvent vapor is directed through an outlet of the nebulizer to the sample. A stream of typically inert nebulizer gas, such as nitrogen, which is fed to the nebulizer from a separate gas inlet, and mixed with the solvent, is typically used for forming the desorption gas jet.

According to a one aspect, a nebulizer chip is used, which can be made from glass or semiconductor material. According to one embodiment, the chip is formed by attaching together two glass plates which are microfabricated so that suitable solvent inlet/vaporization/heating channel and nebulizer gas channel are formed within the chip. In addition, the chip contains a suitable heater for achieving the vaporization of the solvent and heating of the solvent gas. Typically, the solvent vapor is generated and heated by resistive heating by a resistor arranged close to the solvent channel. The solvent gas and the nebulizer gas are mixed in a mixing zone within the nebulizer and sprayed as a confined jet through the nozzle.

Instead or a nebulizer chip, also any other means capable of forming a jet of heated vapor towards the desorption area can be used. For example, a capillary tube or a multiple-capillary tube configuration having suitable heating means for the vapor and capable of directing a heated vapor jet towards the sample can be used.

The temperature and/or flow rate of the vapor-phase solvent can be varied during the ionization process easily by controlling the power of the heater and/or the flow rates of the solvent and/or the nebulizer gas. Consequently, the desorption dynamics at the desorption area, i.e., the area on the substrate to which the vapor jet is directed, change. This allows for ionization of very different kinds of samples.

According to one aspect, the temperature of the solvent vapor flow is 110-300° C., in particular 130-240° C., measured at the surface of the substrate.

According to one aspect, the wavelength of the ionization light is in the vacuum ultraviolet range, preferably 100-200 nm, in particular 100-150 nm. Light can be produced, for example, by a xenon, argon or krypton discharge lamp.

When performing multi-sample mass-spectrometric assays, the vapor-phase solvent flow and the ionization light are sequentially directed to at least two separate sample areas of the substrate. A strength of the present method is that the temperature of the solvent vapor can be rapidly changed between the sample areas (or even during the analysis of a single area), thus offering the possibility to obtain spectrometric data on the samples at a very wide range.

The flow of liquid phase solvent may vary between of 0.1 μL/min and 1 mL/min. If a nebulizing chip is used, the flow rate of the solvent typically varies between 0.1 and 50 μL/min. The device is dimensioned such that practically all the solvent fed to the nebulizer can vaporized, heated and further sprayed to the desorption area. The dimensioning of the inlet channel of the solvent defines in practice the maximum flow of solvent. A monolithic nebulizer structure allows for very small flow rates to be used, in particular less than 15 μL/min.

The flow of nebulizer gas may be 10-500 mL/min, in particular 50-300 mL/min. If a nebulizing chip is used, the flow rate typically varies between 120-240 mL/min, but chip designs allowing higher or lower flow rates are possible also.

When the invention applied to mass spectrometry, the species desorbed and ionized from the surface are further separated based on their masses and electric charges and detected using a suitable detector.

The method now presented and discussed is hereinafter called DAPPI (Desorption Atmospheric Pressure PhotoIonization). Mass spectrometry carried out using DAPPI as the ionization method is referred to as DAPPI-MS.

Considerable advantages are achieved by means of the invention. The method is suitable for a various range of surface analysis applications, in particular, in mass spectrometric studies of neutral and nonpolar molecules. Thus, the DAPPI method opens up new possibilities in ambient ionization of surfaces and broadens the range of compounds that can be analyzed by direct ionization-mass spectrometry techniques toward nonpolar compounds. The method may be carried out by introducing the nebulizing gas, by a microfabricated nebulizer chip. However, other introduction methods of gas are possible too, provided that they are capable of producing a gas jet suitable for desorbing analyte species from the substrate concerned. Because of the thermal nature of the desorption process, the present method is easily and rapidly controllable and adaptable for different studies. Also, both proton transfer and charge exchange can be used as the ionization method, depending on the solvent used. The experimental results achieved with DAPPI are very promising (see the Experimental Section), for example, with respect to the sensitivity and stability. However, the exact physical and chemical principles of DAPPI are still under further investigation. Applications of DAPPI include the analysis of a wide range of artificial and natural surfaces, in laboratory as well as in situ. In summary, DAPPI offers a wide range of uses, minimizes the work relating to sample preparation, and is being easy to control depending on the properties of the substrate and/or the sample and/or the analyte.

Also the manufacturing costs of the ionization equipment can be kept low, because the nebulizing portion of the system can be manufactured on a chip using relatively inexpensive materials and conventional manufacturing methods.

As discussed above, the method is suitable for analysis of various kinds of chemical compounds. For example, it can be used in analysing pharmaceutical products, in particular their active agents, or biological samples.

Next, embodiments of the invention are described in more detail with reference to the attached drawings.

DETAILED DESCRIPTION OF THE EMBODIMENTS

Figure 1:
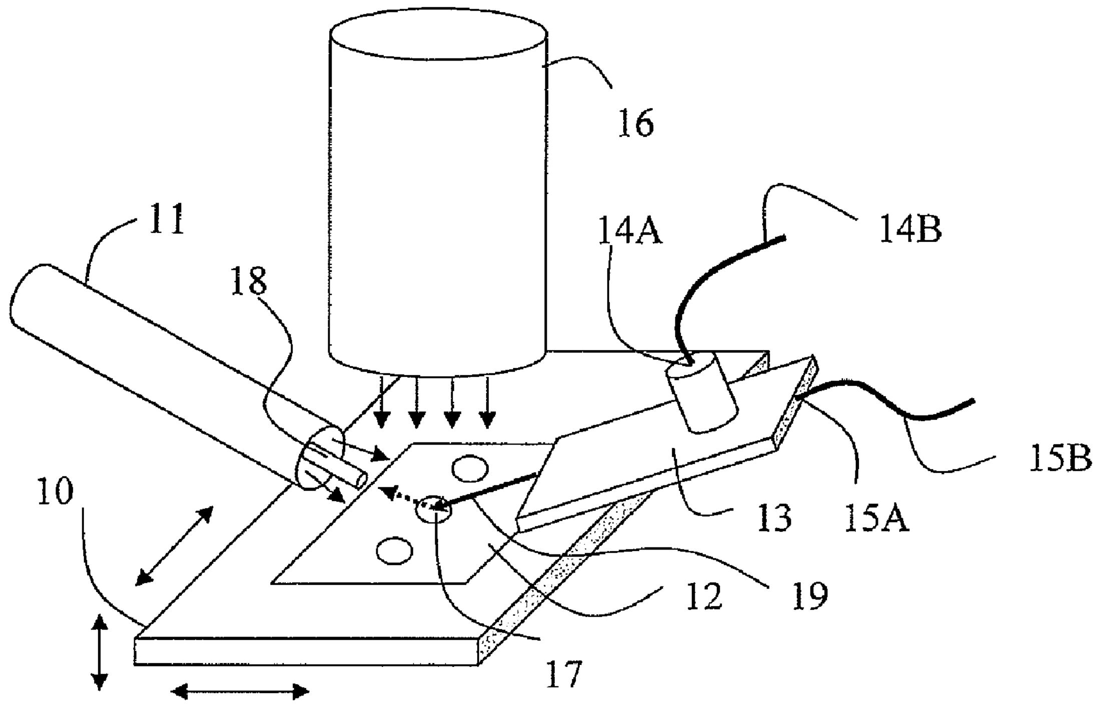
FIG. 1 A perspective view of an exemplary DAPPI-MS setup.

With reference to FIG. 1, the present system according to one embodiment comprises a nebulizer 13 for desorbing analyte particles from a desorption area 17 of the substrate. An UV light source 16 is adapted above the desorption area 17 for directing to the desorption area light capable of ionizing analyte particles.

Figure 2:
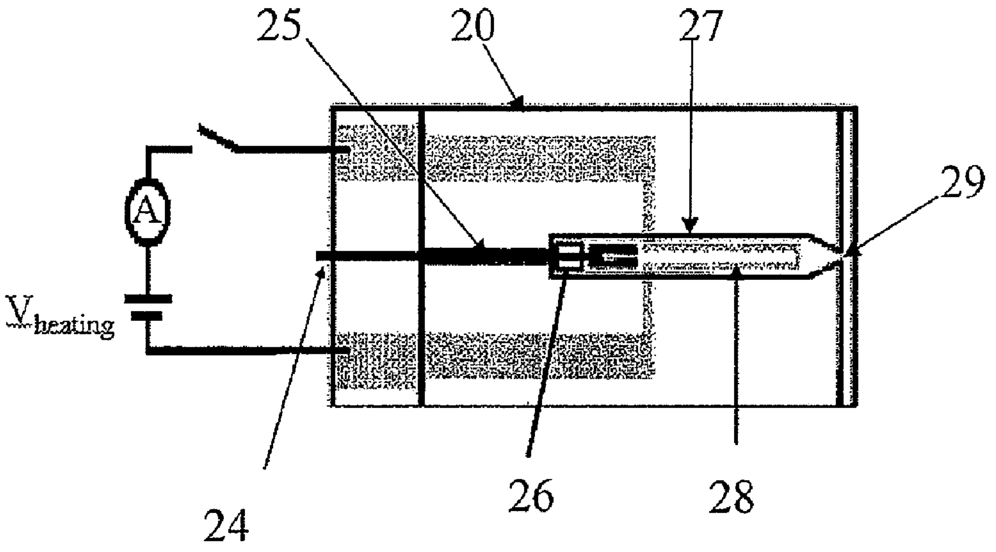
FIG. 2 A top view of a nebulizer chip suitable for DAPPI.

The nebulizer 13, shown in more detail in FIG. 2, comprises an inlet 15A, 24 for a liquid solvent and an inlet 14A, 26 for nebulizer gas. The solvent and nebulizer gas inlet conduits are denoted with reference numerals 15B and 14B, respectively, in FIG. 1. In the nebulizer 13, 20, the solvent is vaporized. The solvent is introduced in the channel for solvent introduction 25. The nebulizer gas and the solvent are mixed in mixing zone before or after vaporization of the solvent in order to form desorption gas. The nebulizer 13, 20 further comprises a heater 28 for heating the desorption gas to a temperature above the vaporization temperature of the solvent. The heating mainly takes place in the heating channel 27, which is in thermal connection with the heater 28. The heater 28 is typically a resistive heater, in particular a platinum heater, driven by a voltage source $V_{heating}$. The nebulizer further comprises a nozzle 29, connected to the heating channel 27, for forming a directed jet 19 of heated desorption gas to the desorption area 17.

The system may also comprise a controller (now shown) for adjusting the power of the heater in order to regulate the temperature of the desorption gas.

According to one embodiment, the nebulizer is manufactured as a monolithic structure where the heating channel is formed between two glass plates for heating the desorption gas. The channel may be meandering in shape so as to provide sufficient heat transfer area between the heater and the gas.

The system may also comprise means 10 for moving the substrate 12 and the nozzle with respect to each other for allowing analyte from a plurality of sample areas 17 to be ionized successively.

For allowing mass spectrometry (DAPPI-MS), the system also comprises a mass spectrometer. The collector of the mass spectrometer is denoted with the reference numeral 18 in FIG. 1. The mass spectrometer is adapted to collect desorbed and ionized analyte particles from the desorption zone and can be a unit known in the art. According to one embodiment, a stream of hot drying gas is conducted to the desorption zone from a drying gas conduit 11 in the vicinity of the collector. As shown in FIG. 1, the nozzle of the nebulizer and the ion collector 18 of the mass spectrometer can be arranged in angular positions with respect to the surface of the substrate facing each other and the substrate, the incidence angles being, for example 10-70° with respect to the surface plane of the substrate at the sample zone.

In the DAPPI-MS technique described above, a confined heated vapor jet from a heated nebulizer microchip and photons emitted by a lamp are directed towards the sample. The vapor jet and photons desorb and ionize analytes from the surface and the ions are collected into a mass spectrometer. The efficiency of DAPPI-MS was tested by analyzing dried sample spots of compounds of different polarities from a polymer surface. Finally, the applicability of DAPPI-MS in the analysis of authentic samples was demonstrated by the direct analysis of pharmaceuticals from tablet surfaces.

In the following experimental section, the present DAPPI technique and its instrumentation are presented more closely and their application to the rapid analysis of compounds of various polarities on surfaces is demonstrated. The demonstrations rely on a heated nebulizer microchip delivering a heated jet of vaporized solvent, e.g., toluene, and a photoionization lamp emitting 10-eV photons. The solvent jet is directed towards sample spots on a surface, causing the desorption of analytes from the surface. The photons emitted by the lamp ionize the analytes, which are then directed into the mass spectrometer. The limits of detection obtained with DAPPI were in the range of 56-670 fmol. Also, the direct analysis of pharmaceuticals from a tablet surface was successfully demonstrated. A comparison of the performance of DAPPI with that of the popular desorption electrospray ionization (DESI) method was done with four standard compounds. DAPPI was shown to be equally or more sensitive especially in the case of less polar analytes.

Experimental Section

Chemicals

The water was purified with a Milli-Q purification system (Millipore, Molsheim, France). HPLC-grade methanol, toluene, acetone, and hexane were purchased from Mallinckrodt Baker B.V. (Deventer, the Netherlands). The standard compounds verapamil hydrochloride and anthracene were purchased from Sigma-Aldrich (Steinheim, Germany), and testosterone was from Fluka Chemie (Buchs, Switzerland). The stock solution of methylenedioxymethamphetamine (MDMA, ecstasy) in methanol (1 mg/mL) was provided by United Laboratories Ltd. (Helsinki, Finland). Tenox tablets (20 mg temazepam) were purchased from Orion (Espoo, Finland) and Tylenol Cold tablets ((80 mg acetaminophen, 0.5 mg chlorpheniramine maleate, 2.5 mg dextromethorphane HBr, and 7.5 mg pseudoephedrine) from McNeil PPC Inc. (Fort Washington, Pa., USA).

Sample Preparation

Stock solutions of verapamil and testosterone (10 mM) were prepared in methanol and a stock solution of anthracene (10 mM) was prepared in toluene. Further dilutions of the standard compounds were made with methanol or water/methanol (50/50, v/v). In both DAPPI and DESI experiments, polymethyl methacrylate (PMMA) plates of 3-mm thickness and roughly 2 cm×4 cm area were used as sample plates. Samples of 1-μL volume were pipetted ~7 mm apart on the plates and the droplets were left to dry at ambient temperature. A plate with dried sample spots was placed on the sampling mount and the mount was moved for the analysis of individual spots.

Microchip Nebulizer

A microfabricated nebulizer chip was used as a source for heated solvent and gas mixture. The chip consists of two glass plates bonded together. A liquid inlet channel, nebulizer gas inlet, vaporizer channel, and nozzle are etched on the top plate and a platinum heater is integrated on the blank bottom plate. Liquid entering the chip through a silica capillary is mixed with nebulizer gas in the heated vaporizer. The nozzle creates a confined jet of the heated vapor as the vapor exits the chip. The manufacturing process for the chips is briefly described as follows. A low-pressure chemical vapor deposition (LPCVD) silicon layer is deposited on a Pyrex 7740 wafer. The silicon is patterned by double-sided lithography and isotropic silicon wet etching and it then acts as a hard mask in through-wafer glass etching. The glass is etched simultaneously from both sides in hydrofluoric acid, and the remaining silicon mask is removed in tetramethyl ammonium hydroxide (TMAH). A blank glass wafer is fusion bonded to the etched channel wafer. Platinum is sputtered on the blank wafer side and patterned by wet etching. The wafer stack is diced into individual chips with a wafer saw. Finally, a methyl-deactivated transfer capillary (SGE, Victoria, Australia) of size 50 μm/220 μm (i.d./o.d.) is glued in place inside the vaporization channel with high-temperature-resistant epoxy (Duralco 4703, Cotronics Corp., Brooklyn, N.Y., USA), and a Nanoport™ connectors (Upchurch Scientific Inc., Oak Harbor, Wash., USA) is attached with an adhesive ring.

DAPPI-MS

The experiments were conducted with a Bruker Esquire 3000 Plus ion trap mass spectrometer (Bruker Daltonics GmbH, Bremen, Germany). The atmospheric pressure ion source was equipped with a drying gas extension (Agilent Technologies, Santa Clara, Calif., USA) attached to the heated capillary set to −4 kV. Nitrogen generated from liquid nitrogen was used as a drying gas for the mass spectrometer with a flow rate of 4 L/min and as a nebulizer gas for the microchip nebulizer with flow rates ranging from 50 to 300 mL/min. The drying gas temperature was 285° C. The nebulizer gas flow rate was adjusted with the internal nebulizer gas pressure controller of the mass spectrometer and measured with an Agilent mass flow meter (Santa Clara, Calif., USA). Solvent was infused with a syringe pump (Cole Palmer, Vernon Hills, Ill., USA) with flow rates in the range of 1-15 μL/min. The microchip was heated with an adjustable DC power supply (Thurlby-Thandar Instruments Ltd, Huntingdon, England) to temperatures from ambient to 500° C. The MS data were acquired with esquireControl 5.3 software.

A schematic close-up view of the DAPPI system is shown in FIG. 2. The DAPPI apparatus consists of the heated nebulizer microchip, a photoionization lamp, and a sampling mount. The lamp is a krypton DC discharge UV lamp with 10-eV photon energy (PKS 100; Cathodeon, Cambridge, England), which is installed in a Vespel® holder and powered with a custom-made APPI power source (Electronics Facility and Mechanical Shop, University of Groningen, the Netherlands). The sampling mount and MS inlet extension are in horizontal position and the lamp is aligned perpendicular to them. The microchip nebulizer is at an angle of ~45 degrees from horizontal. Positions of the microchip and the sampling mount in relation to the inlet of the mass spectrometer can be adjusted with two independent manual xyz-positioning stages (Proxeon Biosystems, Odense, Denmark). The entire apparatus is mounted on a stand and the stand is attached to the mass spectrometer instead of a standard ion source.

The temperature of the vapor jet was measured separately with a miniature wire thermocouple of 25-μm diameter. The thermocouple was attached to a computer-controlled linear xyz-stage and the temperature was measured at the center of the jet at a distance of 10 mm from the chip nozzle. Solvent (toluene) flow rate was 10 μL/min and nebulizer gas flow rate 180 mL/min.

DESI-MS

The Bruker Esquire ion trap with drying gas extension was also used in the DESI experiments. The DESI system consisted of a grounded solvent delivery line, a coaxial line for delivering the nebulizer gas ($N_2$), and two independent manual xyz-stages (Proxeon Biosystems A/S, Odense, Denmark) for positioning the sprayer and the sample mount. A manual rotating stage (Newport Corporation, Irvine, Calif.) that housed the sprayer was used to control the impact angle. As with DAPPI, the DESI system was installed on a stand that was attached to the mass spectrometer instead of a standard ionization source. The MS capillary voltage was −6 kV, drying gas flow 4 L/min, drying gas temperature 250° C., and the nebulizer gas pressure 10 bar. The impact angle was 50°. A water/methanol/formic acid (50/50/+0.1%, v/v) mixture at 2.5 μL/min was used as the sprayer solvent.

Results

Positioning

The positions of the different components in the DAPPI system were adjusted to achieve maximum sensitivity and stability. The vapor jet and the spot where the jet hits the surface (later referred to as the sampling spot) were positioned on-axis with the MS inlet. The distance between the nebulizer nozzle and the sampling spot was adjusted to approx. 10 mm and the distance between the sampling spot and the MS inlet to approx. 3 mm. The distance between the chip nozzle and the sampling spot was not a crucial parameter since the vapor jet is highly confined and the diameter of the jet is constant at approx 1 mm up to 14 mm distance from the nozzle. The distance between the sampling spot and the MS inlet was not a critical parameter within the range of 2 to 8 mm. The photoionization lamp was positioned ~10 mm above the sampling spot. The exact radial distribution of the UV light emitted by the lamp is unknown, but owing to the internal structure of the lamp, the distribution is inherently nonconfined. Thus the UV light illuminates not only the sampling spot but also the end of the incoming vapor jet and the analytes desorbed from the surface.

Since the vapor jet is invisible and causes no visible damage to the polymeric, in this case PMMA, surface, the sampling spot is normally invisible. To verify the exact position of the spot, a piece of polystyrene was placed on the sampling mount instead of the PMMA sampling plate. The sampling spot became visible in a few seconds, when softening induced by the heated vapor jet caused the polystyrene to become deformed. The deformed spot was roughly 1.5 mm in diameter, verifying the localized nature of the surface heating in the DAPPI method.

Temperature

Figure 3A:
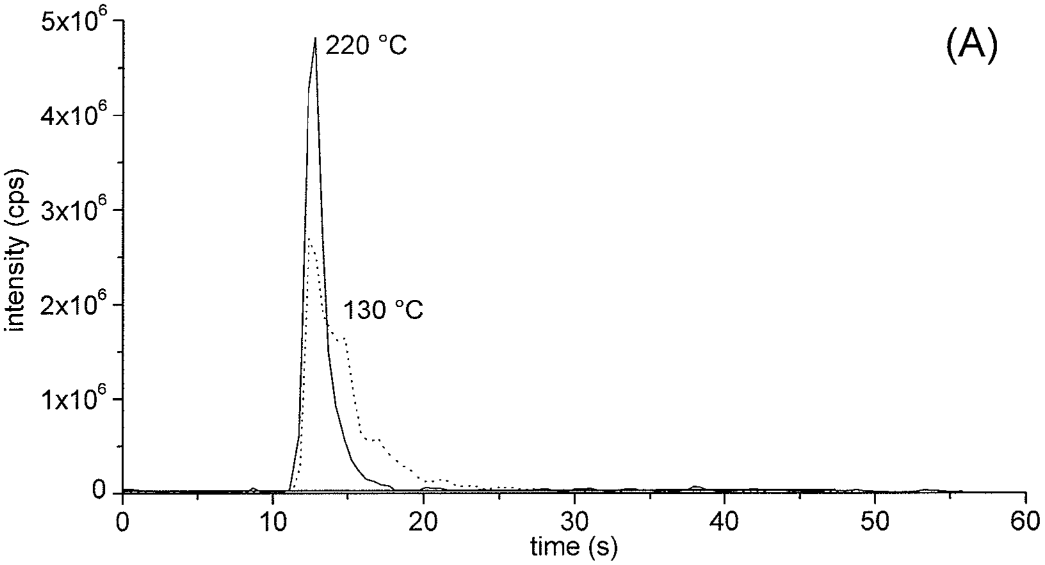
FIG. 3 Extracted ion chromatograms of (A) 50 pmol of anthracene and (B) 10 pmol of testosterone with DAPPI-MS at vapor jet temperatures of 220° C. and 130° C.
Figure 3B:
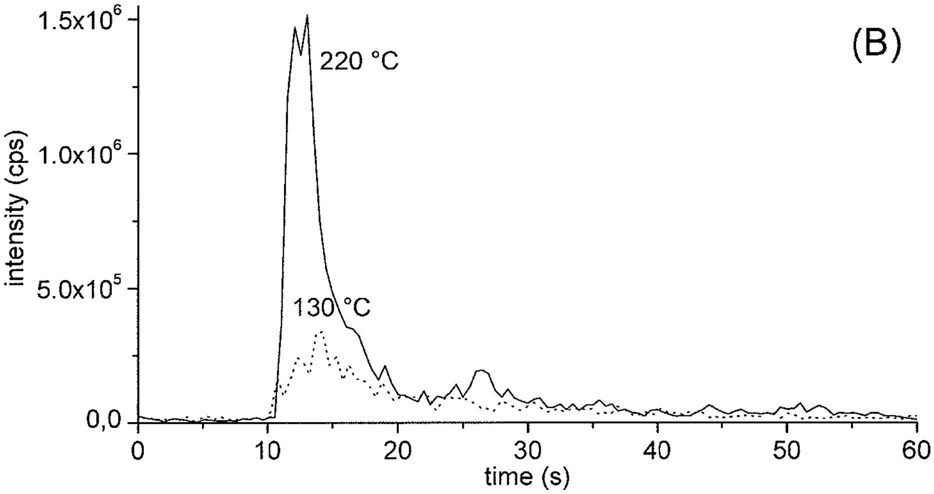

One of the benefits of DAPPI, in particular using the nebulizer chip of the present kind, is that it allows rapid adjustment of temperature. The heating and cooling times are fast enough to enable the application of different temperatures for different samples on the same sample plate without prolonging the analysis time. The effect of the vapor jet temperature on the desorption/ionization of anthracene and testosterone was tested by varying the heating power of the chip in the range of 2-5 W. These values correspond to vapor jet temperatures of approx. 130-240° C. at a distance of 10 mm from the nozzle. The upper limit of the heating power is determined by the durability of the platinum heater, which decreases at heating powers above 5 W. The intensity of the molecular ions or protonated molecules of the analytes increased with the temperature. The higher the boiling point of the analyte, the higher was the temperature needed for efficient desorption. FIG. 3 shows the effect of temperature on the ion chromatograms of anthracene (A) and testosterone (B) when spots of 50 pmol of anthracene and 10 pmol of testosterone were analyzed with vapor jet temperatures of 130 and 220° C. The signals for both anthracene and testosterone are more stable and intense with temperature of 220° C. than 130° C. and the signals last longer with the lower temperature due to lower desorption efficiency. In general, the analyte signal lasted from a few seconds to 20 seconds depending on the analyte and the temperature of the vapor jet. The lower the boiling point of the analyte, the narrower was its signal. This effect is clearly seen in FIG. 3, where anthracene produces a much narrower peak than testosterone. The analytes were completely desorbed from the surface by the vapor jet, which was verified by analyzing a previously analyzed sample plate again. No signal of any of the analytes was detected when the vapor jet was moved back and forth over the sample spots. The extracted ion was m/z 178 for anthracene and m/z 289 for testosterone. The nebulizer gas flow rate was 180 mL/min and the solvent was toluene at 10 μL/min.

Solvent and Nebulizer Gas

Study was next made of effects of nebulizer gas and spray solvent flow rates on the ionization efficiency. The flow rate of the nebulizer gas was varied from 50 to 300 mL/min while the intensity of the molecular ion of anthracene was monitored. The highest intensity was detected at a flow rate of about 180 mL/min. Below and above that value, the intensity decreased, in agreement with previous experience with microchip nebulizers (data not shown). The vapor jet is narrow and confined within a flow rate range of roughly 100-200 mL/min, but below and above that the jet is considerably wider and its range shorter. In DAPPI, narrow, confined jet leads to more localized heating and thus more efficient desorption of the analytes. A nebulizer gas flow of 180 mL/min was used in all further experiments.

The effect of solvent flow rate on the ionization efficiency was tested with toluene as the solvent and anthracene, MDMA, testosterone, and verapamil as the test compounds. No analyte signal was detected with zero solvent flow, but flow rate of even 1 μL/min led to considerable ionization. In general, solvent flow rates at and above 8 μL/min gave the strongest signals; above 8 μL/min the signals of all compounds remained more or less constant. That is, a certain amount of dopant is beneficial for efficient ionization, but increase in the amount above that level does not enhance the processes leading to ionization of the analytes. A flow rate of 10 μL/min was adopted in further experiments unless otherwise noted.

Analysis of Standard Compounds

The analytical potential of the DAPPI method was evaluated by analyzing the test compounds, of which anthracene and testosterone are relatively nonpolar and MDMA and verapamil are bases. The solvents tested were pure toluene and acetone, toluene/acetone (50/50, v/v), toluene/methanol and acetone/methanol (50/50 and 10/90, v/v) and pure methanol. The most intense signals were achieved with pure toluene and acetone and with toluene/acetone (50/50). No significant signal was seen for any of the analytes with pure methanol and the signal was considerably lower with mixtures of methanol and toluene or acetone than with pure toluene or acetone. All four analytes were ionized with toluene, with neutral anthracene and testosterone giving the strongest signals. With acetone, the signals for testosterone, MDMA, and verapamil were intense, but no signal was observed for anthracene. Toluene and acetone were used in further experiments.

Figure 4A:
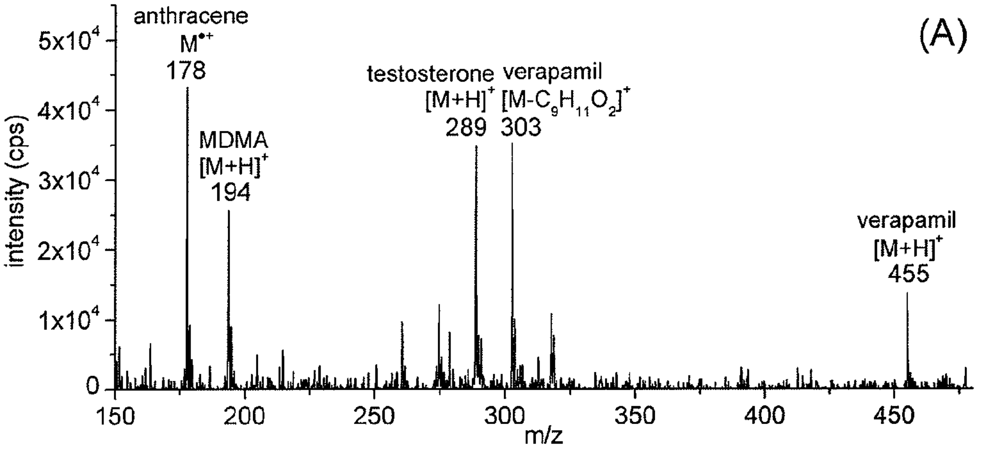
FIG. 4 Background subtracted mass spectra of anthracene, testosterone, MDMA, and verapamil measured by (A) DAPPI-MS with toluene as solvent, (B) DAPPI-MS with acetone as solvent, and (C) DESI-MS with water/methanol/formic acid (50/50/+0.1%) as solvent.

FIG. 4A presents a mass spectrum of the four test compounds with toluene at 10 μL/min as the solvent, vapor jet temperature approx. 220° C., and nebulizer gas flow rate 180 mL/min. The amounts of anthracene, testosterone, MDMA, and verapamil on the spots were 10, 1, 10, and 10 pmol, respectively. Signals of all compounds are clearly visible, with anthracene as the highest peak in the spectrum. Taking into account the smaller amount of testosterone than of other compounds, it was desorbed and ionized most efficiently. Anthracene shows a molecular ion at m/z 178, while testosterone, MDMA, and verapamil show protonated molecules at m/z 289, 194, and 455, respectively. The ion at m/z 303 was identified as a fragment of verapamil. Fragments of verapamil have also been detected with conventional APCI and APPI. Here, the intensity of m/z 303 was independent of the vapor jet temperature, which indicates a non thermal cause of the fragmentation. The other three test compounds showed no signs of fragmentation although testosterone has previously shown to fragment with APCI. The background noise caused by toluene is relatively high even with background subtraction. The anthracene molecular ion was concluded to have formed through charge exchange with the toluene molecular ion by the following gas-phase reactions, previously presented for APPI:

$$C_7H_8\text{(toluene)}+10\text{-eV photons}\rightarrow C_7H_8^{\bullet+}+e^-$$

$$C_7H_8^{\bullet+}+M\text{(analyte)}\rightarrow M^{\bullet+}+C_7H_8.$$

The protonated molecules of the other three compounds were probably formed by proton transfer from the toluene molecular ion (or protonated acetone where acetone was used) by the following reactions:

$$C_7H_8+10\text{-eV photons}\rightarrow C_7H_8^{\bullet+}+e^-$$

$$C_7H_8^{\bullet+}+M\text{(analyte)}\rightarrow MH^{+}+C_7H_7^{\bullet}.$$

Since the exact desorption mechanism in DAPPI is unknown, the ionization mechanisms presented above are unverified, though likely on the basis of the ionization mechanisms in APPI.

Figure 4B:
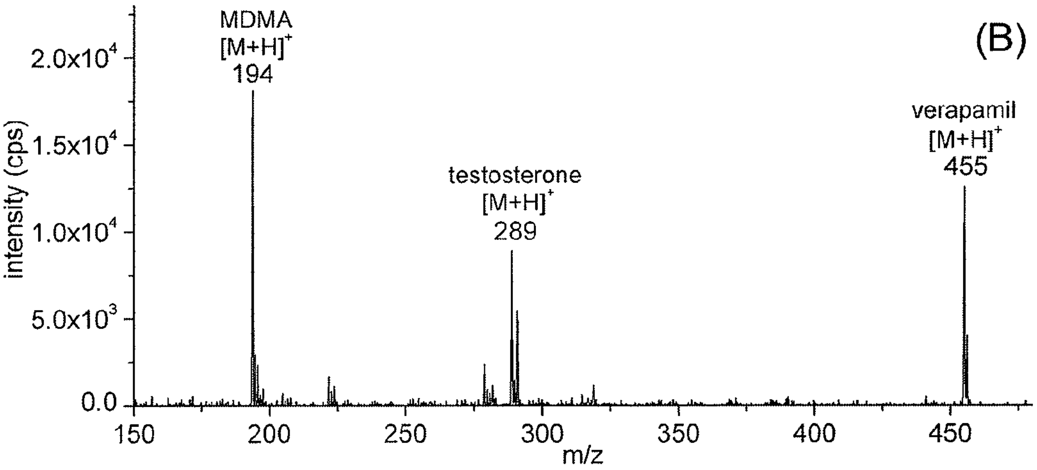

FIG. 4B shows a mass spectrum of the four test compounds measured with DAPPI with acetone as the solvent. All experimental parameters were the same as with toluene. No ions from anthracene are observed, but the other the analytes show intense protonated molecules. Since the ionization energy of anthracene is 7.44 eV and that of acetone 9.70 eV, charge exchange reaction between anthracene and the molecular ion of acetone would take place if the latter were present. However, the background spectrum of acetone showed only the protonated molecule and protonated dimer of acetone, so the charge exchange reaction could not take place. In APPI, acetone works best for polar compounds that can be ionized through proton-transfer, whereas ionization of nonpolar compounds through charge exchange is usually not achieved. The intensities of testosterone, MDMA, and verapamil with acetone are somewhat lower than those with toluene, but owing to the considerably lower background, the signal-to-noise ratios were higher than with toluene. Similarly, the use of acetone as dopant in APPI causes a lower background than use of toluene. The lower background could be due to the different ionization routes with the two solvents: with toluene both proton transfer and charge exchange can take place, which leads to a broader range of ionizable impurities, whereas with acetone the only possible ionization mechanism is proton transfer.

Figure 4C:
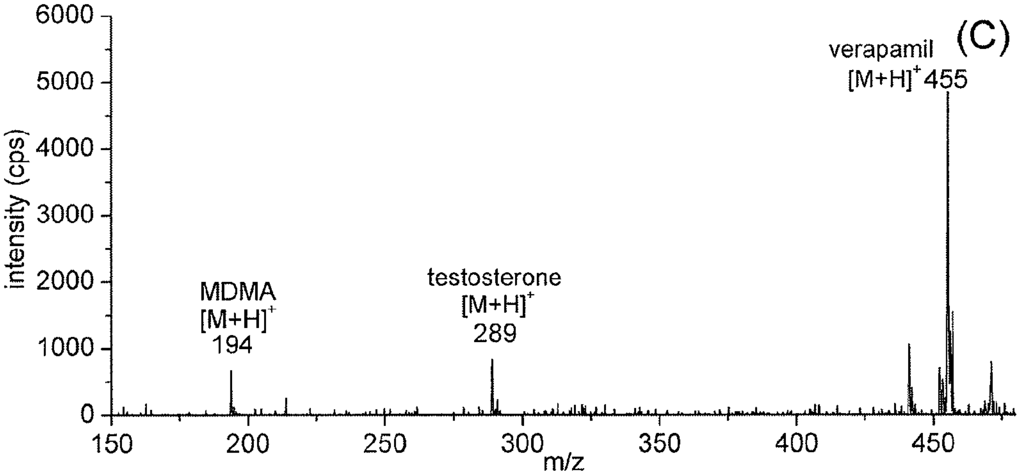

To compare the performance of DAPPI with that of DESI, the test compounds were also analyzed with DESI. FIG. 4C shows a mass spectrum of the four compounds measured with DESI, using water/methanol (50/50, v/v) with 0.1% formic acid as the spray solvent at a flow rate of 2.5 μL/min. The nebulizer gas pressure was 10 bar and the amount of each compound 10 pmol. The spectrum shows the same ions as DAPPI with acetone (FIG. 4B) but is different from the spectrum obtained with DAPPI with toluene (FIG. 4A): verapamil shows an intense protonated molecule, while the signals for testosterone and MDMA are much weaker and there is no signal for anthracene. Note, moreover, that the concentration of testosterone is ten times higher in the DESI experiment than in the DAPPI experiments (FIGS. 4A and 4B). This comparison clearly demonstrates the advantage of DAPPI in the ionization of neutral and nonpolar analytes.

Sensitivity

The sensitivity of DAPPI was tested by determining the limits of detection (LOD) for MDMA, testosterone, and verapamil in selected reaction monitoring (SRM) mode and for anthracene in full-scan MS mode without background subtraction. The SRM mode did not improve the anthracene signal owing to inadequate fragmentation. The selected precursor/product ion pairs were m/z 194/163 for MDMA, m/z 289/271 for testosterone, and m/z 455/178 for verapamil. Toluene was used as the solvent for anthracene and testosterone, and acetone for MDMA and verapamil. The amount of sample that gave signal-to-noise ratio (S/N) of 3 was chosen as the LOD. The S/Ns were determined by analyzing eight spots and calculating the average of the S/Ns. The LODs for anthracene, testosterone, MDMA, and verapamil were 670, 83, 56, and 56 fmol, respectively. These values are on the same level as those obtained by DESI for polar compounds such as MDMA and verapamil and much lower for the neutral testosterone and for the completely nonpolar anthracene. Anthracene is indeed unlikely to be ionized in DESI. The high sensitivity of DAPPI was mainly attributed to the efficient desorption of the whole sample spot by the hot vapor. Efficient desorption also resulted in good stability (see discussion above on the effect of vapor temperature), which, in some cases, is difficult to achieve with surface ionization techniques.

Principles of DAPPI

On the basis of the results presented above, we propose that the desorption/ionization mechanism of DAPPI is a combination of thermal and chemical processes. Since the intensity increases with the temperature of the vapor jet, the desorption is probably largely thermal, although the dissolving properties of the solvent may enhance the desorption. The effect of the nebulizer gas velocity in the desorption process differs in DAPPI and DESI, since the gas velocity in DAPPI is only a fraction of the velocity of solvent droplets in DESI. In DAPPI, with a gas flow rate of 180 mL/min, the average linear velocity at the chip nozzle is 30 m/s and lower further in the jet, while in DESI the mean velocity of the solvent droplets is typically 120 m/s. In addition, in DAPPI the high temperature of the chip vaporizes the solvent efficiently and it is not probable that actual droplets exist in the heated vapor jet. In DESI charged droplets have a crucial role. The ionization in DAPPI is initiated by the photons emitted by the UV lamp and no signal of any of the analytes was detected with the UV lamp switched off. Additionally, the presence of dopant-like solvent (toluene or acetone) was necessary for the ionization of the analytes, which suggests that the ionization in DAPPI is initiated by the photoionization of the dopant. The selectivity of ionization in DAPPI can be controlled by choosing solvents that promote either charge-exchange or proton-transfer.

Analysis of Tablets

Figure 5:
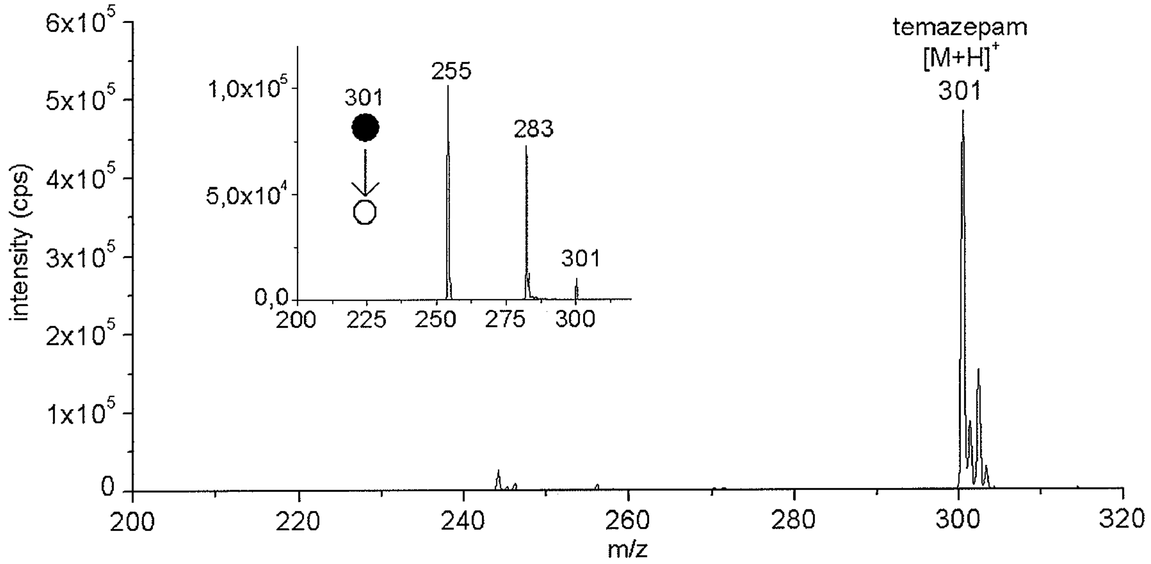
FIG. 5 Analysis of Tenox tablets with DAPPI-MS and the product ion spectrum of m/z 301. Solvent toluene at 10 μL/min. Background not subtracted.

Finally, the applicability of DAPPI in the qualitative analysis of pharmaceuticals from a tablet surface was demonstrated. Instead of the sample plate, tablets were placed under the photoionization lamp, and the vapor jet was directed towards the tablet. Nebulizer gas flow rate was 180 mL/min, toluene flow rate 10 μL/min, and vapor jet temperature approx. 220° C. FIG. 5 presents the mass spectrum of a Tenox tablet (20 mg temazepam). The spectrum shows a base peak at m/z 301, which was verified by tandem MS as the protonated molecule of temazepam.

Figure 6:
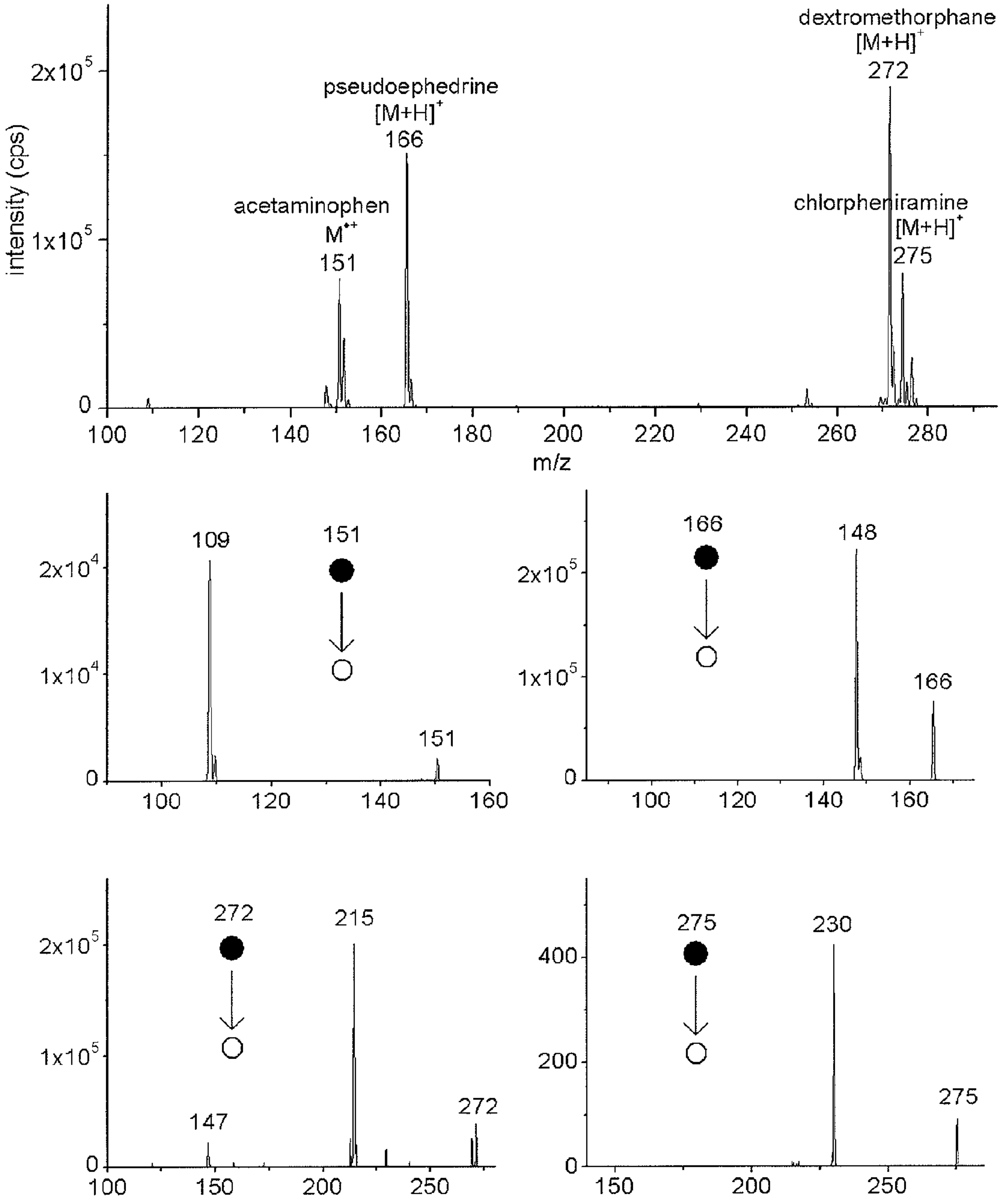
FIG. 6 Analysis of Tylenol Cold tablets by DAPPI-MS and the product ion spectra of m/z 151, 166, 272, and 275. Background not subtracted.

FIG. 6 presents the mass spectrum of a Tylenol Cold tablet (80 mg acetaminophen, 0.5 mg chlorpheniramine maleate, 2.5 mg dextromethorphane HBr, and 7.5 mg pseudoephedrine). The experimental parameters were as noted above. The spectrum shows intense ions at m/z 151, 166, 272, and 275, which were verified to be the molecular ion of acetaminophen and the protonated molecules of pseudoephedrine, dextromethorphane, and chlorpheniramine, respectively. The solvent in the experiment of FIG. 6 was toluene at the flow rate of 10 μL/min.

The specific embodiments described above and those illustrated in the appended figures are not to be regarded as limiting the invention in any way. The scope of protection is defined in the following claims, taking the doctrine of equivalents into account.

The invention claimed is:

1. A method for ionizing analyte-containing sample lying on a surface of a substrate, comprising:

directing to the sample a heated flow of desorption gas in order to desorb analyte from the surface, the desorption gas comprising a mixture of solvent-free nebulizing gas and solvent vapor, and simultaneously directing to the sample light capable of ionizing the desorbed analyte in the presence of the desorption gas, wherein said desorption gas is produced and directed to the sample by feeding a liquid solvent and a nebulizer gas to a nebulizer, in the nebulizer, vaporizing the liquid solvent by heating to a target temperature above the vaporizing temperature of the solvent, directing the heated solvent vapor through an outlet of the nebulizer to the sample using a stream of the nebulizing gas, whereby said heating is strong enough to produce desorption gas essentially free of solvent droplets, and the ionization of the analyte takes place at least partly indirectly through ionization of the solvent vapor by said light.

2. The method according to claim 1, wherein a glass- or semiconductor-based nebulizer chip is used.

3. The method according to claim 1, wherein the desorption gas is heated by resistive heating.

4. The method according to claim 1, wherein the temperature of the desorption gas is varied during the ionization process.

5. The method according to claim 1, wherein the temperature of the desorption gas is 130-240° C., measured at the surface of the substrate.

6. The method according to claim 1, wherein the desorption gas and the ionization light are sequentially directed to at least two separate sample areas of the substrate.

7. The method according to claim 1, wherein the wavelength of the ionization light is in the vacuum ultraviolet range.

8. The method according to claim 1, wherein the flow of solvent vapor directed to the sample corresponds to a liquid-phase solvent flow of 0.1 μL/min-1 mL/min.

9. The method according to claim 1, wherein the flow of nebulizer gas is 10-500 mL/min.

10. The method according to claim 1, wherein the solvent vapor is a dopant-like solvent selected from the group consisting of toluene and acetone.

11. The method according to claim 1, wherein the wavelength of the ionization light is in the range of 100-200 nm.

12. The method according to claim 1, wherein the flow of solvent vapor directed to the sample corresponds to a liquid-phase solvent flow of 0.1-5 μL/min.

13. The method according to claim 1, wherein the flow of nebulizer gas is 50-300 mL/min.

14. The method according to claim 1, wherein the flow of nebulizer gas is 120-240 mL/min.

15. A method for mass spectrometric analysis of an analyte-containing sample lying on a surface of a substrate, comprising directing to the sample a heated flow of desorption gas in order to desorb analyte from the surface, the desorption as comprising a mixture of solvent-free nebulizing gas and solvent vapor, and simultaneously directing to the sample light capable of ionizing the analyte in order to form analyte ions, and separating and detecting the analyte ions based on their masses and electric charges wherein said desorption gas is produced and directed to the sample by feeding a liquid solvent and a nebulizer gas to a nebulizer, in the nebulizer, vaporizing the liquid solvent by heating to a target temperature above the vaporizing temperature of the solvent, directing the heated solvent vapor through an outlet of the nebulizer to the sample using a stream of the nebulizing gas, whereby the desorption gas is essentially free of solvent droplets, and the ionization of the analyte takes place at least partly indirectly through ionization of the solvent vapor by said light.

* * * * *